United States Patent [19]

Schefbauer

[11] 4,301,055

[45] Nov. 17, 1981

[54] PRINTING INKS CONTAINING NOVEL LIMED RESINATES

[75] Inventor: Rupert J. Schefbauer, Hasbrouck Heights, N.J.

[73] Assignee: Inmont Corporation, Clifton, N.J.

[21] Appl. No.: 137,924

[22] Filed: Apr. 7, 1980

Related U.S. Application Data

[63] Continuation-in-part of Ser. No. 65,651, Aug. 10, 1979, abandoned, which is a continuation-in-part of Ser. No. 932,971, Aug. 11, 1978, abandoned.

[51] Int. Cl.$^3$ .................... C08K 5/01; C08L 93/04; C09D 11/08
[52] U.S. Cl. .................... 260/33.6 R; 106/30; 106/239; 260/27 R; 260/27 BB; 260/23.7 C
[58] Field of Search .......... 260/27 R, 27 BB, 23.7 C, 260/33.6 R, 97, 97.5, 99.5; 106/30, 239

[56] References Cited

U.S. PATENT DOCUMENTS

| | | | |
|---|---|---|---|
| 3,560,455 | 2/1971 | Hazen et al. | 260/78.5 |
| 3,560,456 | 2/1971 | Hazen et al. | 260/78.5 |
| 3,560,457 | 2/1971 | Hazen et al. | 260/78.5 |
| 3,655,629 | 4/1972 | Takahara | 526/272 |
| 3,706,704 | 12/1972 | Heilman | 260/78.5 R |
| 3,729,451 | 4/1973 | Blecke et al. | 526/272 |
| 3,775,381 | 11/1973 | Hayashi et al. | 260/78.4 D |
| 3,997,487 | 12/1976 | Rees et al. | 260/27 BB |
| 4,071,581 | 1/1978 | Yokoyama | 260/878 R |
| 4,092,283 | 5/1978 | Oishi et al. | 260/27 BB |
| 4,169,821 | 10/1979 | Werner et al. | 260/27 R |
| 4,244,866 | 1/1981 | Schefbauer | 260/23.7 C |

*Primary Examiner*—H. S. Cockeram
*Attorney, Agent, or Firm*—Michael R. Chipaloski

[57] ABSTRACT

Improved limed resinates are disclosed. The calcium resinates comprise the reaction product of calcium hydroxide and rosins with a polyanhydride of an $\alpha$-olefin-maleic anhydride. Printing inks containing the improved limed resinates are also disclosed.

10 Claims, No Drawings

PRINTING INKS CONTAINING NOVEL LIMED RESINATES

This application is a continuation-in-part of Ser. No. 065,651, filed Aug. 10, 1979, now abandoned, which in turn is a continuation-in-part of Ser. No. 932,971, filed Aug. 11, 1978 now abandoned.

BACKGROUND OF THE INVENTION

The present invention relates to printing inks containing a liquid hydrocarbon solution of a limed resinous binder wherein said binder comprises the reaction product of calcium hydroxide and rosins wich a polyanhydride of an α-olefin-maleic anhydride. The invention relates also to the method of making the ink vehicles.

Limed rosin is widely used in inks, coatings, etc., and is prepared by the fusion method or the solution method. The solution method is very desirable when the limed resinate can be made in a solvent that is useful in the ink or coating that is to be prepared. In coatings and inks using hydrocarbons as solvent, it is necessary that the limed rosin be soluble in the commonly used hydrocarbon solvent. In the past it has been impossible to prepare limed rosins, especially limed tall oil rosin, or mixtures of rosin which include tall oil rosin, that are soluble in hydrocarbons when the degree of liming is more than about two-thirds of the amount of lime required to form the di-resinate. Rosin consists predominantly of resinous monocarboxylic acids with only a minor amount of non-acidic material. Tall oil rosin differs from wood and gum rosins in that it contains 2-3% of fatty acids. The rosin acids are monocarboxylic acids of alkyl hydrophenanthrene, e.g. abietic acid. In the liming process the monocarboxylic acids of rosin react with calcium hydroxide to form calcium salts, or resinates. Theoretically, the resinous acids can react to form either calcium di-resinate or basic calcium mono-resinate, i.e., Ca' (resinate) or CA (OH) (resinate). The calcium di-resinate contains approximately 6.2% calcium while the basic calcium monoresinate contains 11.2% calcium. In accordance with prior art processes, it is not possible to incorporate more than about 6 to 7 parts of calcium hydroxide per 100 parts of rosin in a solution liming of rosin, especially tall oil rosin. Assuming complete conversion of lime to di-resinate, this would give a product containing 3.06 to 3.56 calcium. As the percentage of calcium increases, the melting point of the resinate increases, and this is important in the printing ink field, and results in it being desirable to increase the degree of liming in order to obtain the more desirable higher melting resinates. Therefore, there is a need and a desire in the industry to have a solution method for making high melting calcium resinates that are soluble in hydrocarbon solvents commonly used in printing inks and coatings.

In co-pending application Ser. No. 947,146 filed Sept. 29, 1978 entitled Calcium Resinates and Inks, limed resinates and printing inks containing the limed resinates are disclosed. The application describes the preparation of a rosin preferably limed in solution in a hydrocarbon solvent in the presence of a polymeric polycarboxylic acid wherein the polymeric polycarboxylic acid is a partial ester of a 1.3:1 molar ratio copolymer of maleic anhydride and α-olefin.

SUMMARY OF THE INVENTION

The present invention provides for an improved limed resinate and a method of making an improved limed resinate. In accordance with the invention, rosin is limed in solution, in a hydrocarbon solvent, and in the presence of an α-olefin-maleic anhydride polyanhydride. The invention also provides a printing ink consisting of a pigment dispersed in a hydrocarbon solution of a limed resinous binder wherein said binder comprises the reaction product of calcium hydroxide and rosins, with a polyanhydride of an α-olefin-maleic anhydride.

DETAILED DESCRIPTION OF THE INVENTION

In accordance with this invention, improved limed resinates are obtained by carrying out a liming reaction in a hydrocarbon solution in the presence of rosins and an anhydride copolymer of α-olefin-maleic anhydride. The use of an anhydride copolymer of α-olefin-maleic anhydride eliminates the esterification reaction step of copending application Ser. No. 947,146 and therefore yields a product useful in printing inks that eliminates one reaction step, i.e., esterification. The resulting resinate solutions, when used in printing inks, especially gravure printing inks, produce inks having improved properties such as greater solubility of the resin in solvent. This improved solubility results in an ink having higher concentration of resin in the printing ink composition. The inks provide prints having improved film properties when printed. The major improvements in film properties are improvement in gloss, adhesion of the ink to the substrate, toughness of the ink film and the ink film has better abrasion resistance. In limed rosin inks made by conventional liming of rosin, the art has used ethyl cellulose to improve ink properties. In accordance with the present invention, the limed resinates prepared in accordance with the invention can be used to prepare ink having good film properties without using ethyl cellulose. Also, the improved resinates of the invention are compatible wth ethyl cellulose and, therefore, can be used with ethyl cellulose in inks where it is desirable to do so.

The invention provides for a printing ink consisting of a pigment dispersed in a vehicle consisting of a hydrocarbon solution of a limed resinous binder wherein said binder comprises the reaction product of calcium hydroxide and rosins with a polyanhydride of an α-olefin-maleic anhydride.

In accordance with the invention, rosin is preferably limed in solution in hydrocarbon solvent in the presence of the α-olefin-maleic anhydride polyanhydride.

Preferably the α-olefin will contain 18 or more carbon atoms. The use of longer chain α-olefins favors the use of the anhydride copolymer with maleic anhydride, without esterification, in the liming reaction. In co-pending application Ser. No. 846,749 it was found that the use of lower α-olefins (up to 18 carbon atoms) without esterification resulted in an insoluble product being formed. Pure α-olefins containing at least 18 carbon atoms in the chain such as octadecene, etc., can be used, but grades or mixtures containing two or more of the α-olefins are preferred for economic reasons. Suitable mixtures are obtainable, for instance, from Chevron Chemical Co., Gulf Oil Chemicals, Co., Ethyl Corp. and Shell Chemical Co. These products are represented to contain more than 75% of the n-alpha olefins and no more than 9% of saturated hydrocarbons. Typical analysis of commercial grades of alpha olefins that are operable in the invention are:

Gulf Alpha Olefin Fractions
(Available from Gulf Oil Chemical Company)
Gulf Octadecene-1 ($C_{18}$), 90.8% n-alpha olefin, 98.6% mono-olefins, 1.4% saturated hydrocarbons, 98% $C_{18}$ hydrocarbon.
Gulf Alpha Olefin Fraction $C_{20}$–$C_{24}$, 1% $C_{18}$ hydrocarbon, 49% $C_{20}$ hydrocarbon, 42% $C_{22}$ hydrocarbon, 8% $C_{24}$ hydrocarbon, less than 0.1% of $C_{26}$ hydrocarbon.
Gulf Alpha Olefin Fraction $C_{24}$–$C_{28}$, 0.3% $C_{22}$ hydrocarbon, 28% $C_{24}$ hydrocarbon, 44% $C_{26}$ hydrocarbon, 20% $C_{28}$ hydrocarbon, 8% $C_{30}$ hydrocarbon.
Gulf Alpha Olefin Fraction $C_{22}$–$C_{24}$, 1.8% $C_{20}$ hydrocarbon, 69.8% $C_{22}$ hydrocarbon, 28.4% $C_{24}$ hydrocarbon.
Chevron Alpha Olefins
(Available from Chevron Chemical Co., Industrial Chemicals Division)
$C_{18}$–$C_{20}$ Fraction: 8.9% paraffin hydrocarbon, 3.6% diolefin hydrocarbon, 86.3% n-alpha olefin, 1.4% $C_{17}$ hydrocarbon, 22.6% $C_{18}$ hydrocarbon, 37% $C_{19}$ hydrocarbon, 30% $C_{20}$ hydrocarbon, 9% $C_{21}$ hydrocarbon.

A 1.3:1 molar ratio of a maleic anhydride and α-olefin is preferable and will vary on a weight equivalent basis with the carbon chain length of the α-olefin. The polyanhydride is preferably used in the range of 3–30% by weight of total resins in the liming reaction.

Preferably a mixture of rosins are used in preparing the limed resinates having improved film properties. The particular mixture used is determined by the particular circumstances existing at the time, such as availability, price, and color of the different rosins, and the particular ink application involved. The choice of the particular mixture to use at a particular time is within the skill of the ink formulator.

Gravure printing inks, especially inks used for publication printing, contain limed rosins of various types as the resin component. Mixtures of light, dark and polymerization types are generally used. However, light rosins, whether gum or tall oil types, do not usually produce clear, homogeneous, products when limed. Also, the limed products do not contribute to increasing the viscosity of the ink vehicle as desired and thus do not promote solvent reduction of the inks to printing viscosity.

Advantageously the liming reaction is carried out in a hydrocarbon solvent that is useful in printing inks and coatings, such as Lactol Spirits, Rotosolve, Magie Oil, toluene, xylene, etc. If the resinate is to be used in gravure ink, Lactol Spirits, Rotosolve or toluene are preferred solvents. The reaction is carried out by adding lime, or preferably a mixture of lime and urea, to a solution of the resins at a temperature below about 125 degrees F. and then, after an initial exotherm, heating the mixture at higher temperatures, up to the reflux temperature, until the liming reaction is complete, e.g., until the theoretical amount of water has been driven off, or until no more water can be driven off, or until a clear solution is obtained. The resulting resinate solution is then used in printing inks and coatings.

Limed resinate prepared in accordance with the invention can be used to replace all of limed rosin used in conventional inks. Advantageously, the limed resinate of the present invention is made using mixtures of tall oil rosin with one or more other types of resins, such as wood rosin, gum rosin, polymerized rosin, etc. In the preferred embodiment of the invention, 25% or more, by weight, of the rosin reactant may consist of non-tall oil rosin. Part of the tall oil rosin may consist of a commercial grade of tall oil, i.e., a liquid product containing substantial amounts of fatty acids, e.g., Unitol R, which is a tall oil composed of 52.3% fatty acids, 40.5% tall oil rosin acids, and 7.2% unsaponifiables. Preferably such tall oil products should constitute no more than 10 or 15% by weight of the total rosin reactant. Another relatively inexpensive rosin material that may be included in small amounts, i.e., no more than 10 to 15% of the total rosin reactant, is a still bottoms rosin residue resulting from the polymerization and distillation of rosin, e.g., Melhi.

In addition, a reactive and non-reactive hydrocarbon resin may be used in small amounts, i.e., about 1 to 25% and preferably from about 10 to about 15% of the total resins in the liming reaction. The reactive synthetic resins that can be used include the reaction product of a polydicyclopentadiene and tall oil. For example, a commercial dicyclopentadiene feedstock such as Dow Chemical's dicyclopentadiene concentrate is first polymerized by heating. Such commercially available dicyclopentadiene feedstock concentrates typically contain a second component such as various codimers. This second component of the feedstock in the reaction mixture is itself a mixture of dimerized conjugated aliphatic, cyclic and noncyclic dienes of five carbon atoms, e.g., a mixture consisting eesentially of dimers of isoprene, cis-piperylene and trans-piperylene and codimers, trimers and cotrimers of isoprene, cis-piperylene, trans-piperylene and cyclopentadiene. More particularly, a typical second component mixture may consist essentially of from about 70 to about 90% dimers of isoprene, cis-piperylene and trans-piperylene and codimers, trimers and cotrimers of isoprene, cis-piperylene, trans-piperylene and cyclopentadiene.

After preparation of the polycyclopentadiene, the resin is then treated with tall oil. The tall oil composition typically utilized is refined tall oil, e.g., crude tall oil which has been refined such as by distillation. The refined tall oil typically consists essentially of a predominate amount of tall oil fatty acids and a lesser amount of tall oil resin acids. For example, the refined tall oil may contain from about 50% to about 70% fatty acids, and from about 30% up to less than about 50% rosin acids. Other tall oil compositions containing, for example, from about 10% to about 90% fatty acids and from about 90% to about 10% rosin acids may also be used. Tall oil and particularly refined or distilled tall oil is well known per se and the manner in which it is produced, derived or obtained is not a part of the present invention. Preferably, the tall oil is present in an amount from about 10 to about 30% by weight of the reaction mixture.

The pressures employed in the reaction zone are not critical, with the pressure sufficient to prevent substantial loss by evaporation of the reactants typically being used. Subatmospheric, atmospheric and superatmospheric pressures may be employed, and autogenous pressure in a substantially sealed reaction vessel is typically convenient.

If desired, inert diluents such as toluene or benzene may also be present in the reaction zone or mixture in an amount, for example, of up to about thirty percent based on the total weight of the reaction mixture including the diluent.

Any conventional reactor vessel may be employed for this polymerization reaction, and the polymerization reaction may be conducted in a batch, semi-continuous or continuous manner. Preferably, the polymerization reaction is carried out under agitation, e.g., in a stirred reactor vessel.

Preferred reactive hydrocarbon resins of this type include Nevroz 1520 which is commercially available from Neville Chemical Co. and Zecoroz 750 available from Ziegler Chemical & Mineral Corporation.

Inks prepared in accordance with the invention contain pigment or pigments dispersed in the limed resinate solution. The inks may contain other conventional ink ingredients in minor amounts without departing from the invention. For instance, ethyl cellulose, wax compounds, pigment wetting agents, etc., may be added for their known effects. The major improvements over conventional inks are improvement in gloss, adhesion of the ink to the substrate, toughness of ink film and the ink film has better abrasion resistance.

The invention will next be illustrated in terms of specific examples. In these examples, as well as in the other parts of the present application, all amounts and proportions are expressed on a weight basis unless otherwise indicated.

EXAMPLE I

Preparation of α-Olefin-Maleic Anhydride Polyanhydride 11.00 parts of maleic anhydride (0.13 moles) and 25.66 parts of $C_{20}$–$C_{24}$ alpha olefin (0.10 moles) were copolymerized in 27.52 parts of toluene using 1.03 parts of p-tertiary butyl perbenzoate and heating at 125 degrees C. for 4 to 5 hours. This polyanhydride is referred to below as I.

EXAMPLE II

A limed resin solution was prepared from

|  | Parts |
|---|---|
| Lactol Spirits | 36.2 |
| Wood Rosin | 10.8 |
| Tall Oil Rosin | 10.2 |
| Polymerized Rosin (Melhi) | 5.6 |
| Reactive Hydrocarbon Resin | 20.0 |
| Polyanhydride (Example I) | 13.6 |
| Urea | .8 |
| HYdrated Lime | 2.8 |
| Total | 100.0 | by slowly adding the urea and hydrated lime to the other ingredients at 120 degrees F., and, after the initial exotherm, removing water of reaction by azeotropic distillation. The resulting solution was clear, had a viscosity of 7400 cps. at 76° C. and contained 51% solids. The capillary melting point of the 100% solids resin was 171 degrees to 174 degrees C.

EXAMPLE III

Publication gravure printing inks were prepared from the limed resin solution of Example II as follows:

Yellow Ink was prepared by ball milling
　37 parts limed resin solution (above)
　5 parts benzidine yellow pigment
　12 parts clay
　3 parts Lactol Spirits
　　(boiling range 200 to 223 degrees F.),
　　and then reducing the dispersion with
　37 parts limed resin solution (above)
　3 parts Lactol Spirits
　　(boiling range 200 to 223 degrees F.).

Red Ink - A red printing ink was prepared by ball milling
　38 parts of limed resin solution (above)
　6 parts barium lithol pigment
　20 parts clay
　3 parts toluene
　9 parts Lactol Spirits
　　(boiling range 200 to 223 degrees F.),
　　and then reducing the dispersion with
　24 parts of limed resin solution (above)
　10 parts Lactol Spirits
　　(boiling range 200 to 223 degrees F.).

Blue Ink - A blue printing ink was prepared by ball milling
　30 parts of limed resin solution (as above)
　10 parts iron blue pigment
　13 parts clay
　3 parts toluene
　6 parts Lactol Spirits
　　(boiling range 200 to 223 degrees F.),
　　and then reducing the dispersion with
　31 parts limed resinate solution (as above)
　7 parts Lactol Spirits
　　(boiling range 200 to 223 degrees F.).

The yellow, red and blue inks described above were printed on paper using a gravure, multicolor printing press to obtain high gloss multicolor prints, having excellent abrasion resistance, toughness, and adhesion to the paper.

Equally good, or better results are obtained when a mixture of Rotosolve and toluene, e.g. 83% Rotosolve, 17% toluene, is substituted for Lactol Spirits in the varnish and inks of the above example. Rotosolve is a commercial hydrocarbon solvent mixture—a boiling range of 241 degrees F. to 256 degrees F.

EXAMPLE IV 11.5 parts of $C_{14}$ alpha olefin (0.10 moles) and 7.7 parts of maleic anhydride (0.13 moles) were copolymerized in 13.7 parts of toluene using 0.536 parts of p.-tertiary butyl perbenzoate and heating at 125° C. for 4 to 5 hours. This polyanhydride was used in Example V below.

EXAMPLE V

A limed resin solution was prepared from:

|  | Parts |
|---|---|
| Rotosolve | 39.0 |
| Toluene | 8.0 |
| Tall Oil Rosin | 21.8 |
| Polyanhydride (Example III) | 7.9 |
| Reactive Hydrocarbon Resin | 17.4 |
| Hydrated Lime | 4.9 |
| Urea | 1.0 |
|  | 100.0 |

The material so produced was sludgy and would not dissolve in either lactol spirits or toluene.

EXAMPLE VI 17.10 parts of $C_{18}$ alpha olefin (0.10 moles) and 8.6 parts of maleic anhydride (0.13 moles) were copolymerized in 18.3 parts of toluene using 0.715 of p.-tertiary butyl perbenzoate and heating at 125° C. for 4 to 5 hours. This polyanhydride was used in Example VII.

EXAMPLE VII

A limed resin solution was prepared from:

|  | Parts |
| --- | --- |
| Rotosolve | 33.0 |
| Toluene | 6.6 |
| Tall Oil Rosin | 25.0 |
| Polyanhydride Example V | 9.0 |
| Reactive Hydrocarbon Resin | 20.0 |
| Hydrated Lime | 5.6 |
| Urea | .8 |
|  | 100.0 |

The resulting solution was clear and was useful in preparing a printing ink as in Example III.

EXAMPLE VIII

The product of Example VI was used to prepare a limed resin solution prepared from:

|  | Parts |
| --- | --- |
| Lactol Spirits | 43.5 |
| Tall Oil Rosin | 17.4 |
| Wood Rosin | 18.6 |
| Melhi | 9.6 |
| Polyanhydride Example VI | 5.7 |
| Hydrated Lime | 4.4 |
| Urea | .8 |
|  | 100.0 |

The resulting solution was clear and was useful in preparing a printing ink as in Example III.

What is claimed is:
1. A calcium resinate comprising the reaction product of calcium hydroxide and rosins with
   (a) 1–25% by weight of a reactive hydrocarbon resin, and
   (b) 3–30% by weight of a polyanhydride of $\alpha$-olefin-maleic anhydride.
2. The calcium resinate of claim 1 wherein the rosin is selected from the group consisting of tall oil, wood, gum and polymerized rosin.
3. A resinate as in claim 1 wherein the resinate contains a reactive polycyclopentadiene-tall oil resin.
4. A resinate as in claim 3 wherein the resinate additionally contains a non-reactive hydrocarbon resin.
5. The calcium resinate of claim 3 wherein the polyanhydride comprises an $\alpha$-olefin having greater than 18 carbon atoms.
6. A printing ink comprising a pigment dispersed in a varnish comprised of a solution of calcium resinate in hydrocarbon solvent wherein said calcium resinate comprises the reaction product of calcium hydroxide and rosins with
   (a) 1–25% by weight of a reactive hydrocarbon resin, and
   (b) 3–30% by weight of a polyanhydride of $\alpha$-olefin-maleic anhydride.
7. The printing ink of claim 6 wherein the rosin is selected from the group consisting of tall oil, wood, gum and polymerized rosin.
8. The printing ink of claim 6 wherein the resinate contains a reactive polycyclopentadiene-tall oil resin.
9. A printing ink as in claim 6 wherein the resinate contains a non-reactive hydrocarbon resin.
10. The printing ink of claim 8 wherein the polyanhydride comprises an $\alpha$-olefin having greater than 18 carbon atoms.

* * * * *